INVENTOR.
V. A. RAYBURN
BY S. Gunderson
ATTORNEY

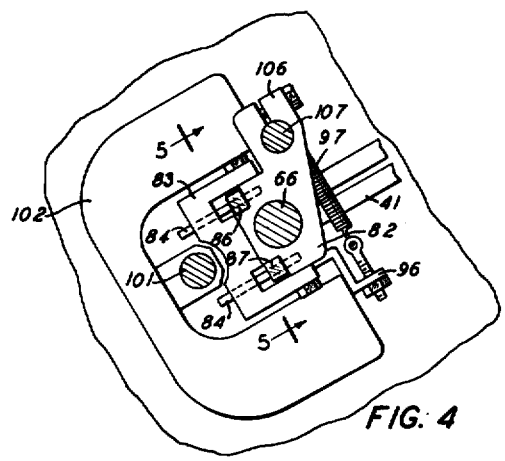
FIG. 4
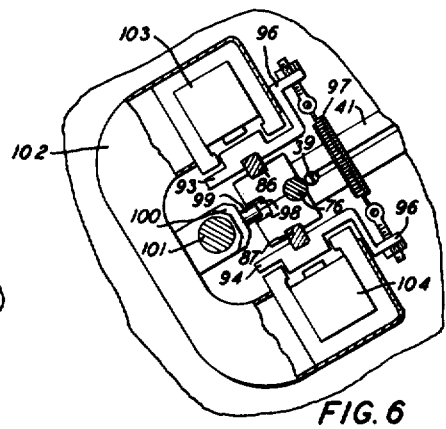
FIG. 6
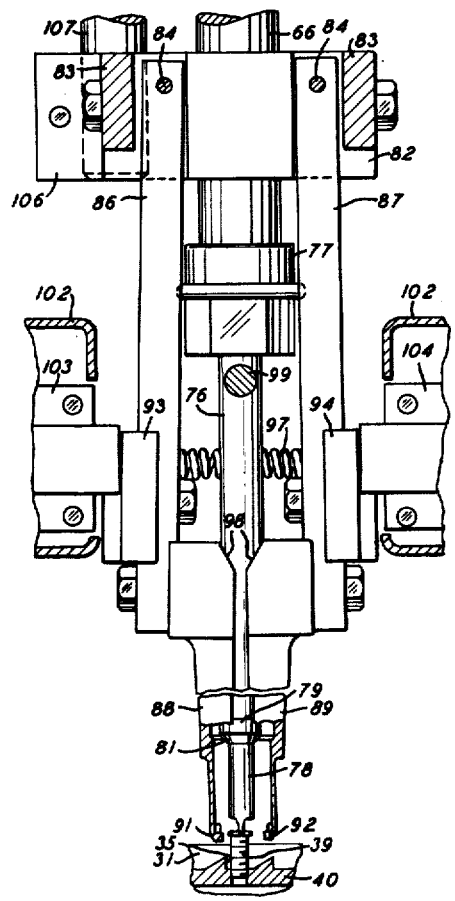
FIG. 5
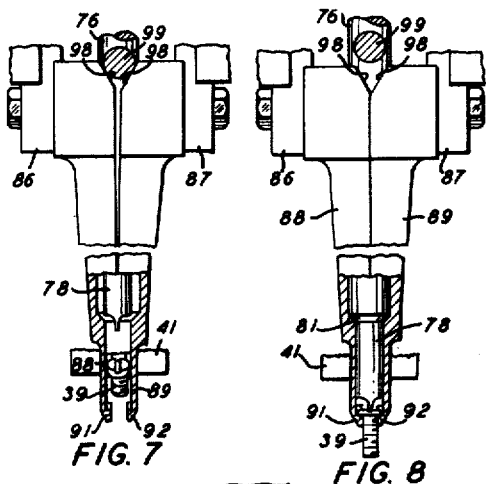
FIG. 7
FIG. 8
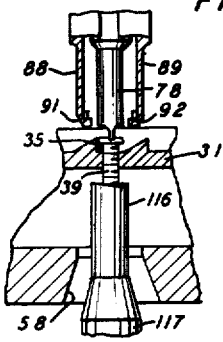
FIG. 9
INVENTOR.
V. A. RAYBURN
BY S. Gundersen
ATTORNEY INVENTOR.
V. A. RAYBURN
BY S. Gundersen
ATTORNEY United States Patent Office 3,187,405
Patented June 8, 1965

3,187,405
SCREW ASSEMBLING AND STAKING
APPARATUS
Vincent A. Rayburn, Baltimore, Md., assignor to Western Electric Company, Incorporated, New York, N.Y., a corporation of New York
Filed Apr. 18, 1963, Ser. No. 273,942
4 Claims. (Cl. 29—33)

This invention relates to screw assembling and staking apparatus.

As disclosed in a copending application in the names of G. E. Murray, V. A. Rayburn, and C. W. Rice, Jr., Serial No. 125,824, filed July 21, 1961, a terminal frame is provided with a plurality of plated or preferably solid brass, aluminum or soft steel screws which are staked at the threaded ends thereof to preclude relatively easy or accidental removal of the screws from the frame by shaking or vibrating but to permit threaded movement therein. In this manner, the terminal frame provides a plurality of terminations for a corresponding plurality of conductors. In the assembly of the screws with the terminal frame, a bifid spring-closed screw-holding device receives the screws one at a time from a supply mechanism and subsequently carries and directs the screws into threaded eyelets at the bottom of recesses in the terminal frame. Heretofore, there were no means provided for spreading screw-inserter fingers of the screw-holding device to release the screw at a proper time and, further, to quickly retract the screw-holding device away from the screw being driven into the eyelet. As a result, the screw-inserter fingers were retained and secured in the recess of the terminal frame by the head of the driven screw. Such a result, which occurred almost consistently, not only damaged the screw head and the terminal frame, but resulted in the breaking of the screwdriver bits and the screw-inserter fingers.

It is, therefore, an object of this invention to provide a screwdriving and spin-staking apparatus, whereby damage to articles assembled and spin-staked by the apparatus and to machine elements of the apparatus is prevented.

With this and other objects in view, the present invention contemplates a screwdriving and staking apparatus which is provided with a pair of opposed fingers having a central passage therebetween for receiving a headed screw therein. A rotatable screwdriver bit attached to a driven spindle is inserted within the passage to engage the head of the screw and thereafter partially drive the screw into a threaded eyelet at the base of a recess of a terminal frame. Means are provided for spreading and retracting the fingers immediately after the screw has engaged the threaded aperture but before it is driven completely within the aperture and immediately prior to the insertion of the fingers within the recess so that a subsequent spin-staking operation will not result in the stripping of the metal on the thread end of the screw and damage to the terminal frame is prevented thereby.

A complete understanding of the invention may be had with reference to the following detailed description when read in conjunction with the appended drawings, wherein:

FIG. 4 is a sectional view taken along line 4—4 of FIG. 2 showing supporting structure for elements utilized in holding and carrying a screw during a screwdriving operation;

FIG. 5 is a sectional view taken along line 5—5 of FIG. 4 showing portions of a screw-holding device and spreading means for same;

FIG. 6 is a sectional view taken along line 6—6 of FIG. 2 showing the arrangement of elements for controlling the spreading of the screw-holding device which positions a screw for a subsequent screwdriving operation;

FIG. 7 is a partial view showing a pair of fingers of the screw-holding device in slight spreading engagement for reception of a screw;

FIG. 8 is a partial view showing a screw captured by the fingers wherein a screwdriving bit is in driving engagement with the screw head;

FIG. 9 is a partial view showing a spin-staking bit in staking engagement with a screw which is fully inserted within a threaded eyelet of a terminal frame;

*General description*

Figure 1:
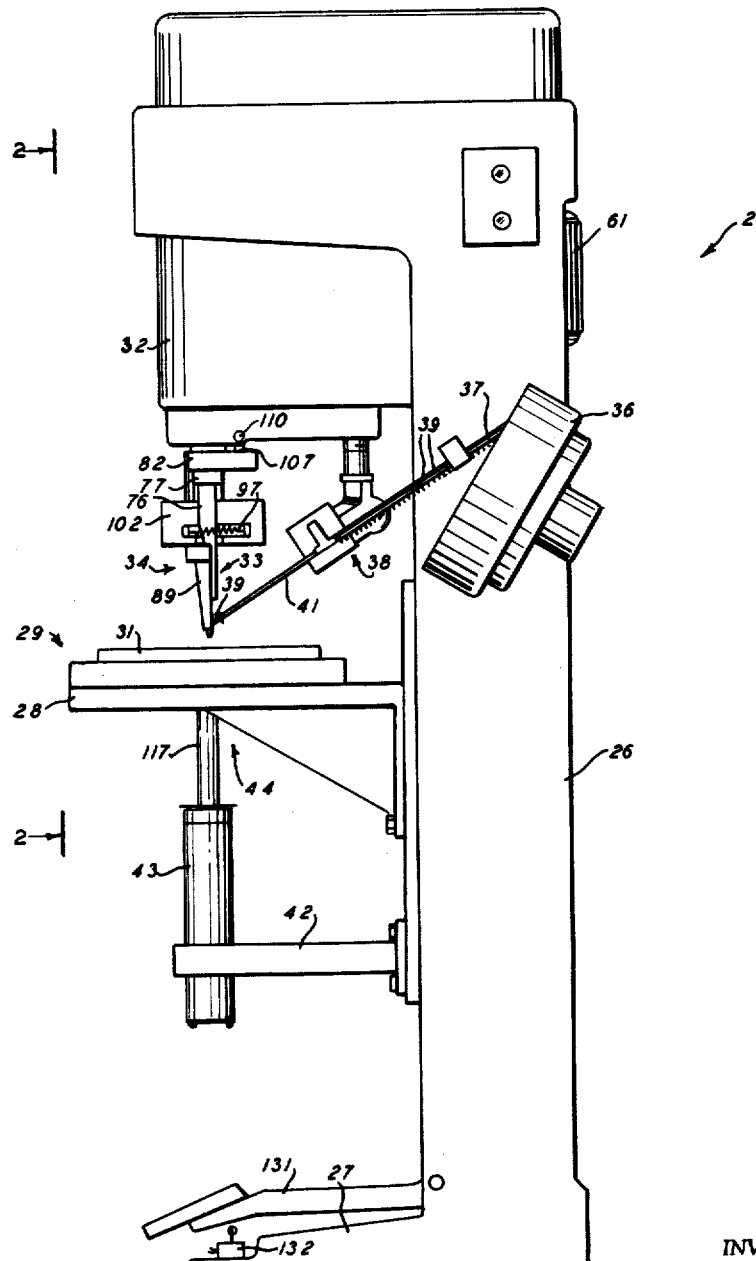
FIG. 1 is a side view of a conventional screwdriving and staking apparatus which is improved to encompass the principles of the invention.

Referring to FIG. 1, an improved, modified screwdriving and spin-staking apparatus, generally designated by the reference numeral 24, is provided with a vertical stand 26 which is supported on a base 27. A shelf 28 extends from the stand 26 and supports a work-holding and positioning fixture, generally designated by the reference numeral 29. The work-holding and positioning fixture 29 carries a terminal frame 31, such as that disclosed in the previously mentioned copending application to Murray et al., where the frame is subsequently positioned for several screwdriving and spin-staking operations. The upper end of the vertical stand 26 supports a housing 32 which houses a driving system for a screwdriving mechanism, generally designated by the reference numeral 33, and a control system for a screw-holding device, generally designated by the reference numeral 34, which extends downwardly from the housing toward the prepositioned terminal frame 31. A hopper 36 is attached to an intermediate portion of the vertical stand 26 and is provided with a slotted chute 37 extending downwardly toward an escapement mechanism, generally designated by the reference numeral 38, which is suspended from the underside of the housing 32. The hopper 36 is actuated to serially feed a plurality of screws 39 into the slotted chute 37, whereby the screws are fed from the chute to the escapement mechanism 38. The escapement mechanism 38 is thereafter actuated to feed singly a screw 39 from the escapement mechanism down an extended portion 41 of the slotted chute 37 to a position adjacent to the screw-holding device 34. Thereafter, the screw 39 is received and captured within the screw-holding device 34 and carried to a position immediately above the terminal frame 31 whereupon the screwdriving mechanism 33 is actuated to insert and partially drive the screw into a threaded eyelet 40 (FIG. 2) which is in the base of a recess 35 (FIG. 9) in the terminal frame. A support arm 42 extends from an intermediate portion of the vertical stand 26 and supports a staker air motor 43 which controls the operation of a spin-staking mechanism, generally designated by the reference numeral 44. Subsequent to the partial insertion of the screw 39 into the terminal frame 31, the staking mechanism 44 is actuated to spin-stake the threaded end of the screw, thereby precluding accidental removal of the screw from the frame but permitting threaded axial movement within the eyelet 40.

Figure 2:
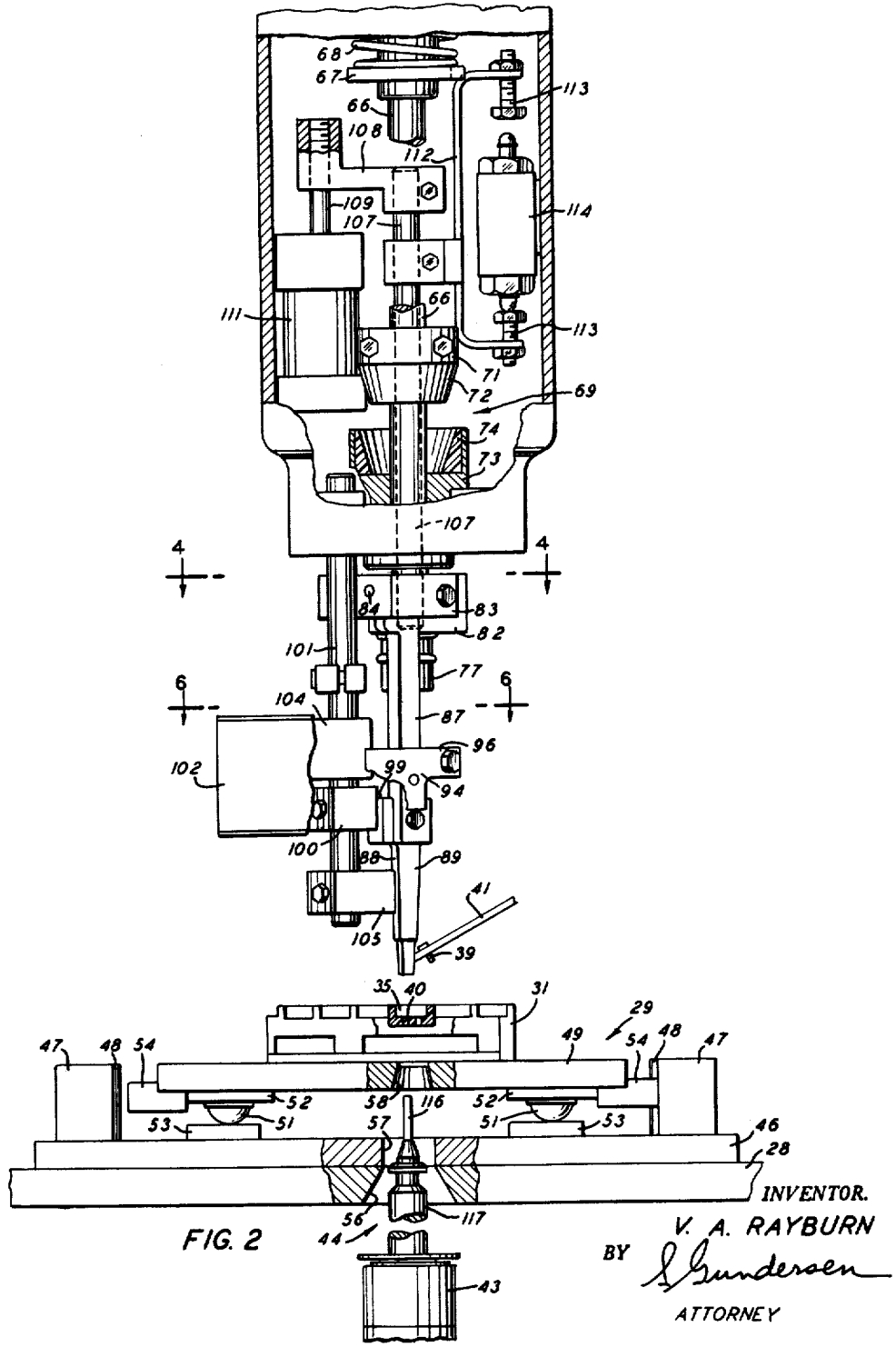
FIG. 2 is a view taken along line 2—2 of FIG. 1 with parts broken away for clarity, showing the relative arrangement of the operational parts of the screwdriving and staking apparatus.
Figure 3:
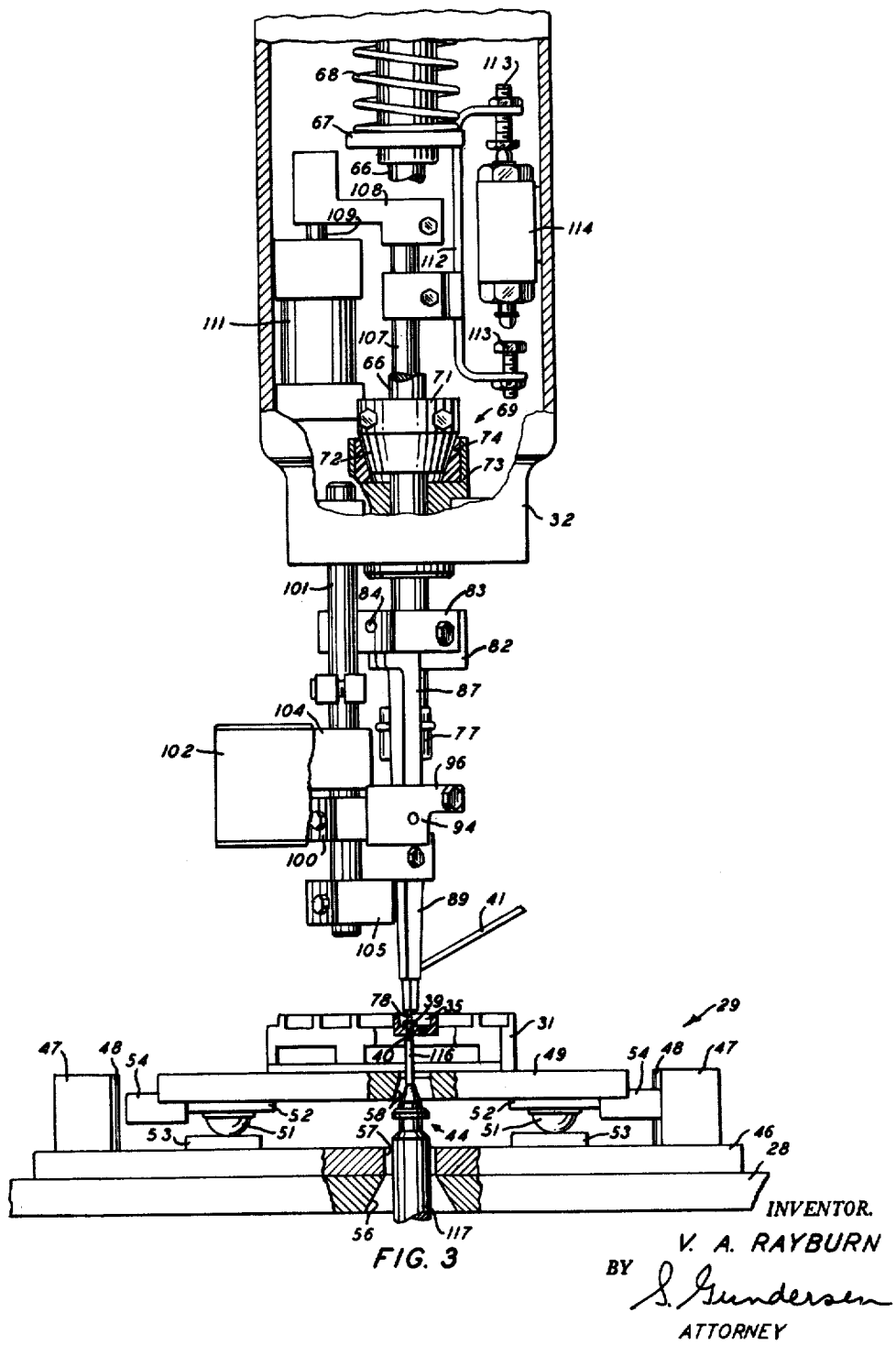
FIG. 3 is a view in accordance with FIG. 2 showing the arrangement of the apparatus during a staking operation wherein a screw is threadedly positioned in a terminal frame and a staking bit is in engagement with the threaded end of the screw.

As shown in FIGS. 2 and 3, the positioning fixture 29 is provided with a base plate 46 secured to the upper surface of the shelf 28 and having upright guideways 47 on opposite edges of the upper surface thereof. Each of the guideways 47 are provided with an indexing pin 48 which protrudes partially from the side of the guideway 47. A table 49 is provided with a jig (not shown) on the upper surface thereof for receiving and aligning the terminal frame 31. Four ball-bearing rollers 51 (only two shown) extend from casters 52 mounted on the underside of the table 49 and are positioned on tracks 53 which are supported by the base plate 46. Positioning-guide bars 54 extend longitudinally along and are attached to opposite sides of the table 49. Outer edges of the positioning-guide bars 54 are formed with scalloped notches (not shown) which cooperate with the indexing pins 48 to position the table, and hence the terminal frame 31, in a desired orientation. Thus, it is seen that the positioning fixture 29 readily facilitates the positioning of the terminal frame 31 relative to the screw-holding device 34 and the screwdriving mechanism 33 for the subsequent insertion and driving of the screw 39 into the terminal frame. In addition, the shelf 28, the plate 46 and the table 49 are provided with apertures 56, 57 and 58, respectively, to facilitate the insertion of the spin-staking mechanism 44 therethrough, whereafter, the threaded end of the previously inserted screw 39 is burnished by spin-staking.

*Screwdriving mechanism*

Figure 10:
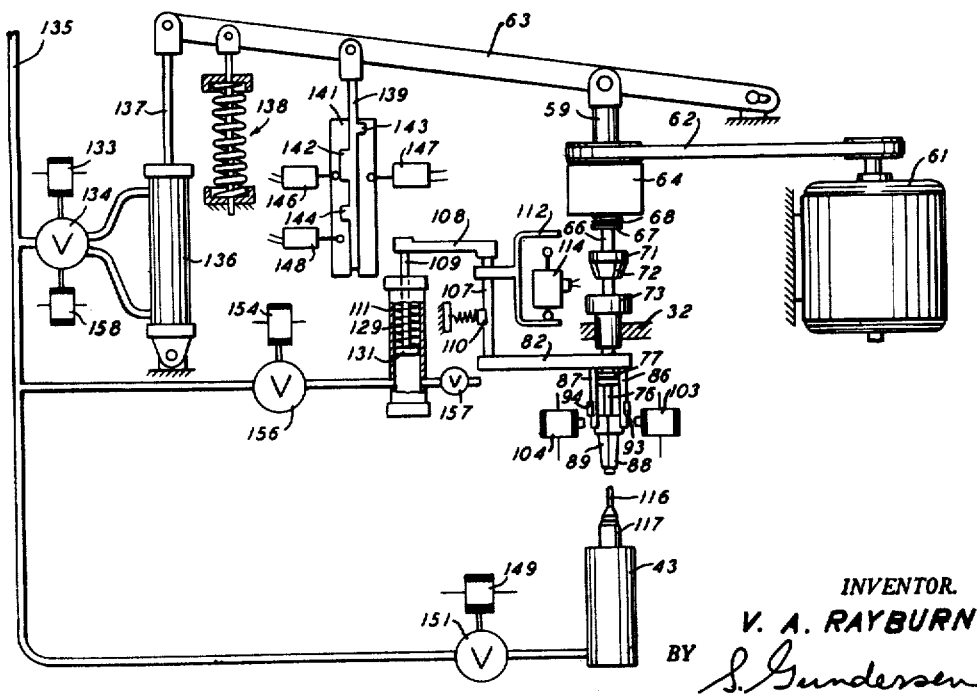
FIG. 10 is a diagrammatical view showing the pneumatic system for operating the screwdriving and staking apparatus.

The screwdriving mechanism 33 is supported in and extends from the housing 32 and, as shown in FIG. 10, is provided with an upper spindle 59 rotatably driven by a motor 61 through a belt arrangement 62 and is reciprocably moved by a pivotally mounted lever 63. The upper spindle 59 is attached to an overload release clutch 64. A driven spindle 66 extends from the clutch 64 and, as shown in FIGS. 2, 3 and 10, is provided with an annular collar 67 which supports a compression spring 68 between the collar and the clutch where the spring cooperates with the clutch to sense an overload upon the driven spindle 66, and, thereafter the driven spindle 66 is released from driving engagement with the clutch. A spindle stop device, generally designated by the reference numeral 69, consists of an inverted frustoconical stop block 71 coaxially positioned about and attached to the spindle 66 for rotational and axial movement therewith and is formed with a downwardly and inwardly tapered shoulder 72. In addition, the spindle 66 is slideably positioned within a conical cup-like spindle bushing 73 which is fixedly attached to the housing 32. Further, the bushing 73 is provided with an insert 74 composed of a friction material such as vulcanized fiber having a shape complementary with the tapered shoulder 72 of the stop block 71 where, upon engagement of the tapered shoulder with the insert, the driven spindle 66 is precluded from further rotational and axial movement. As this occurs, the overload release clutch 64 senses the overload and releases the driven spindle 66 from driving engagement therewith.

As shown in FIG. 5, the lower end of the driven spindle 66 is attached to a spindle extension 76 through a coupling member 77 wherein the lower end of the spindle extension 76 supports a screwdriver bit 78. It is noted that the bit portion of the screwdriver bit 78 is a reduced section of a larger cylindrical portion 79, whereby a tapered shoulder 81 is formed between the enlarged portion and the reduced portion. Thus, it is seen that the operation of the motor 61 and the downward pivotal movement of the lever 63 provide rotational and axial movement, respectively, for the screwdriving mechanism 33 for engaging the screw 39 captured in the screw-holding device 34 and driving the screw into the terminal frame 31.

*Screw-holding device*

As shown in FIGS. 2 and 3, and particularly in FIGS. 4 and 5, the screw-holding device 34 (FIG. 1) is provided with a finger suspension block 82 which is slideably positioned about the driven spindle 66 and further, has a mating suspension member 83 attached to opposite sides thereof. The block 82 and the mating member 83 are each provided with a pair of aligned apertures for receiving a pair of pins 84 therein where the pins pivotally support a pair of finger support arms 86 and 87 which extend downwardly therefrom. A pair of screw-holding and inserting fingers 88 and 89 are attached to the free ends of the arms 86 and 87, respectively, and surround substantially the spindle extension 76 and the screwdriver bit 78. The fingers 88 and 89 are formed with inwardly turned free ends 91 and 92, respectively, and are each formed on the inner walls with a half-section shape complementary to the shape of the screwdriver bit 78, including the enlarged portion 79 and the tapered shoulder 81. As shown in FIGS. 5 and 6, armatures 93 and 94 are attached to an intermediate portion of the arms 86 and 87, respectively, and each is provided with an extension 96 for supporting a tension spring 97 therebetween, whereby the biasing action of the spring urges the arms 86 and 87, and hence the fingers 88 and 89, together as shown in FIG. 8.

Referring to FIGS. 7 and 8, the upper surfaces of the fingers 88 and 89 are formed with opposing bevels 98 which cooperate with a fixed pin 99 extending from a clamp 100 to urge the fingers slightly apart when the screw-holding device 34 is adjacent to the extended portion 41 of the chute 37. Thereafter, the screw 39 is allowed to drop in between the slightly opened fingers and the head of the screw is captured between the inwardly turned ends 91 and 92 of the fingers. As the spindle 66 is urged downwardly, the screwdriver bit 78 engages the head of the captured screw 39 and the gravitational force due to the weight of the screw-holding device 34 cooperates with the downward pressure of the screwdriver bit on the screw head, and hence on the inwardly turned ends 91 and 92, to carry the elements toward the terminal frame 31 in a unit assembly. In this manner, the screw 39 is steadied and aligned for subsequent proper insertion into the threaded eyelet 40, thereby preventing misalignment and damaged product.

*Retracting mechanism for screw-holding device*

The improvement to the conventional screwdriving and spin-staking apparatus 24 embodying the principles of the invention incorporates a retracting mechanism for spreading and withdrawing the fingers 88 and 89 during the final spin-staking and screwdriving operation immediately prior to any insertion of the fingers 88 and 89 within the recess 35 of the terminal frame 31. In this manner, the fingers 88 and 89 are precluded from being caught and secured between the head of the screw 39 and the base of the recess 35 of the terminal frame 31 during the assembly operation whereby damage to the screw head and terminal frame and the breaking of the screwdriver bit 78 and the inserter fingers are prevented. As shown in FIGS. 2, 3, 4 and 6, a support rod 101 is fixedly secured to the housing 32 and extends downwardly therefrom and supports a U-shaped housing 102. A pair of finger spreader solenoids 103 and 104 are supported within the legs of the housing 102 in an opposing fashion and are positioned adjacent to the armatures 93 and 94, respectively, attached to the fingers 88 and 89. Upon actuation of the solenoids 103 and 104, the fingers 88 and 89 are drawn apart by being pivoted away from engagement with the screw 39 immediately prior to any entry of the fingers within the recess 35 of the terminal frame 31 and after the screw engages the threaded eyelet 40 of the terminal frame 31. It is to be noted that a mechanical stop 105 (FIGS. 2 and 3) is secured to the lowermost end of the rod 102 in the path of a shoulder of the fingers 88 and 89 and is adjustable to provide an additional stopping device for precluding the downward movement of the fingers past a definite point.

As shown in FIGS. 4 and 5, the finger suspension block 82 is provided with an extension 106 which is fixedly clamped to a shaft 107 extending slideably from within the housing 32. Referring to FIGS. 2 and 3, the upper end of the shaft 107 is attached to one end of a connecting link 108 which is attached at the opposite end thereof to a piston rod 109 extending from an air cylinder 111 fixedly secured within the housing 32. In addition, a U-shaped cam 112 secured to the shaft 107 for vertical movement therewith, is provided with a pair of adjustable actuators 113 attached to the legs of the U-shaped cam in opposing fashion. A maintained-contact switch 114, which sustains contact after the actuating force has been released, is secured within the housing 32 between the actuators 113 for controlling the spreading operation of the fingers 88 and 89, and the retraction of the fingers subsequent to the spreading thereof. As the screw-holding device 33 approaches the lower position, the upper actuator 113 of the cam 112 engages the plunger of the switch 114, thereby closing the switch to actuate the finger spreader solenoids 103 and 104 to spread apart the fingers 88 and 89, respectively, immediately prior to any insertion of the fingers within the recess 35 of the terminal frame 31. In addition, the closing of the switch 114 operates the air cylinder 111 to retract the opened fingers from the area of the terminal frame 31. As the air cylinder 111 is actuated to retract the fingers 88 and 89, the lower actuator 113 of the cam 112 engages a reset plunger of the switch 114, thereby opening the switch. In this manner, the finger spreader solenoids 103 and 104 are deenergized and the air cylinder 111 is deactuated. A compression spring 129 (FIG. 10) is positioned within the air cylinder 111 between a piston 131 and the upper wall of the air cylinder to normally urge the piston downwardly within the air cylinder when the air pressure applied to the cylinder has been relieved. Therefore, immediately after the air cylinder 111 has been deactuated, the biasing action of the spring 129 urges downwardly the fingers 88 and 89 and the finger-supporting structure. However, a throttling valve 157 is attached to the lowermost end of the air cylinder 111 to bleed off the air captured in the cylinder at a relatively slow rate. In addition, an adjustable friction block 110 (FIGS. 1 and 10) engages an intermediate portion of the slideable shaft 107 to further preclude the rapid downward movement of the fingers 88 and 89. After the screwdriving and spin-staking operations are complete, the spindle 66, and the elements coupled thereto, are retracted upwardly, whereby the coupling member 77 engages the underside of the finger suspension block 82 to raise the finger-supporting structure so that the upper surface of the finger suspension block is urged against the underside of the spindle bushing 73.

Staking mechanism

As shown in FIGS. 2, 3 and 9, the staking mechanism 44 includes a spin-staking bit 116 resiliently attached to a rotatably and axially movable bit holder 117 which extends from the shaft of the staker air cylinder motor 43. Subsequent to the finger spreading and retracting operations, the screw 39 is partially driven into the threaded eyelet 40 of the terminal frame 31, whereafter the driven spindle 66 is detorqued by the cooperation of the stop device 69 and the overload release clutch 64 as previously described. Thereafter, as viewed in FIG. 9, the screwdriving bit 78 precludes further rotational movement of the screw 39 within the threaded eyelet 40 and the staker motor 43 is actuated to rotate and axially raise the spin-staking bit 116 into engagement with the threaded end of the screw, whereby the screw is formed with a staked end 118 having the lowermost threads urged into the spaces between adjacent threads. Thereafter, the spin-staking bit 116 and the screwdriver bit 78 are retracted from engagement with the screw 39 and the table 49 is positioned for the subsequent insertion of another screw into the terminal frame 31 and the spin staking of the screw. It is to be noted that the spin-staking bit 116 is slideably positioned within the bit holder 117 against the biasing action of a compression spring to prevent excess pressure being exerted on the screw during the spin-staking operation.

Operation

Figure 11:
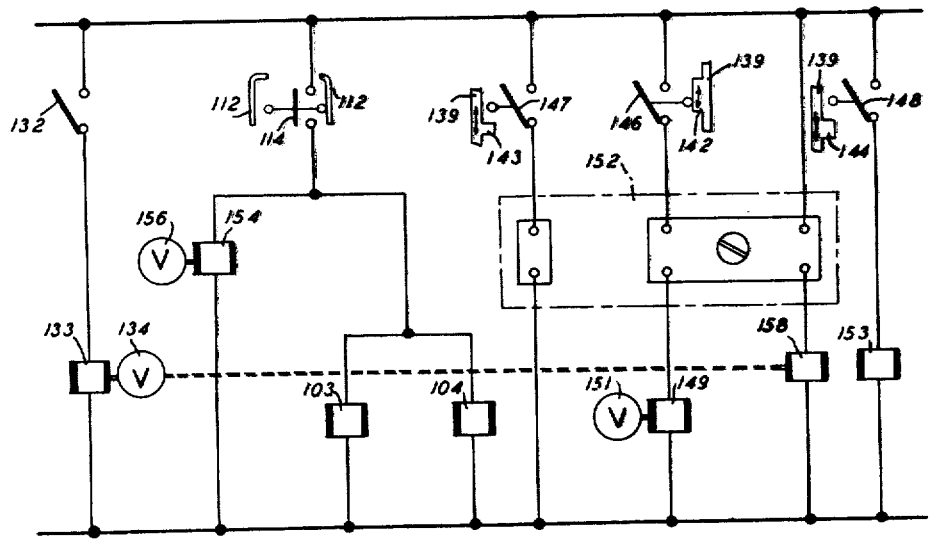
FIG. 11 is an electrical diagram showing the control circuit for the electrical operation of the screwdriving and staking apparatus.

Referring to all of the figures, and particularly to FIGS. 10 and 11, initially, the screw 39 is inserted between the fingers 88 and 89 (FIG. 7) which are spread slightly apart by the cooperation of the pin 99 and the bevels 98 of the fingers. In this position, the spindle drive system is in the retracted position whereby the coupling member 77 engages the underside of the finger suspension block 82 to hold the block in flush engagement with the underside of the spindle bushing 73 and to preclude the downward movement of the finger suspension block, thereby precluding the downward movement of the fingers 88 and 89 and the supporting structure associated therewith. The biasing action of the spring 129 within the air cylinder 111 normally urges the piston 131 downwardly thereby normally urging the finger-supporting structure downwardly. However, in view of the abutting engagement of the coupling member 77 on the underside of the finger suspension block 82, the fingers 88 and 89 are precluded from downward movement until the lowering of the spindle system is initiated. After the screw 39 has fallen between, and is captured by, the fingers 88 and 89, an operator presses a foot treadle 131 (FIGS. 1 and 11) to close a switch 132, whereby a solenoid 133 is actuated. As the solenoid 133 is actuated, double-acting air valve 134 is operated to admit air from an air supply line 135 into an air cylinder 136, whereby a piston rod 137, which extends from the air cylinder 136 and is attached at the free end thereof to the lever 63, is drawn within the air cylinder to pivot the lever 63 downwardly. A compression spring 138 is connected between a fixed member and the lever 63 for normally urging the lever upwardly. Thereafter, the operator releases the foot treadle 131 and the switch 132 is opened to deactuate the solenoid 133. However, the double-acting air valve 134 remains in the previously operated position to continue to admit air to the cylinder 136, thereby continuing the downward movement of the piston rod 137. As the lever 63 is pivoted downwardly, the rotating spindle 59 is moved axially downwardly, whereby the screwdriver bit 78 engages the captured screw 39 (FIG. 8). As the screwdriving spindle system is urged downwardly, the coupling member 77 is moved downwardly, thereby releasing the finger support structure so that the fingers 88 and 89, which hold the captured screw 39, are allowed to move downwardly. The combined forces resulting from the biasing action of the spring 129, the gravitational force due to the weight of the finger-supporting structure and the downward force of the screwdriver bit 78 upon the screw head and the inwardly turned ends 91 and 92 cooperate to move downwardly the fingers 88 and 89. In this manner, the screwdriver bit 78 and the fingers 88 and 89 travel downwardly together, as shown in FIG. 8.

A cam bar 139, which is supported within a guide block 141, is attached at one end thereof to the lever 63 and is formed with a plurality of camming projections 142, 143 and 144 for actuating a corresponding plurality of switches 146, 147 and 148, respectively. As the fingers 88 and 89 and screwdriver bit 78 are urged downwardly to insert the captured screw 39 into the threaded eyelet 40 of the terminal frame 31, an upper shoulder of the fingers 88 and 89 engages the mechanical stop 105 (FIG. 3) to preclude further downward movement of the fingers. Further, the switch 146 rides off the camming projection 142, whereby the switch is closed under its inherent spring action to actuate a solenoid 149 so that a valve 151 is opened to supply air to the staker motor 43 from the air supply line 135. It is to be noted that the solenoid 149 is in series with a pair of normally closed contacts associated with a timer mechanism 152. As air is supplied to the air cylinder 43, the staking bit 116 is rotated and urged upwardly as previously described. Thereafter, the camming projection 143 engages an arm of the switch 147 to close the switch to actuate the timing mechanism 152 whereupon a timing cycle is initiated to control the contacts associated with the timer. In addition, the camming projection 144 engages an arm and closes the switch 148, whereby a solenoid 153 is energized to retract the escape mechanism 38 (FIG. 1), so that a single screw 39 is released to the escapement. Subsequently, the solenoid 153 is deenergized, whereby the escape mechanism 38 returns to a normal position so that the screw is released to slide down the extended portion 41 of the chute 37 and drops into the awaiting screw-clamping device 34. During the period when this sequential operation is taking place, the upper actuator 113 of the U-shaped cam 112 engages the plunger of the maintained-contact switch 114, thereby actuating the switch and energizing the spreader solenoids 103 and 104 to attract the armatures 93 and 94, respectively, so that the arms 88 and 89 are spread to release the previously captured screw 39 as shown in FIG. 5. In addition, the closing of the maintained-contact switch 114 actuates a solenoid 154 which opens an air valve 156 to supply air from the supply line 135 to the air cylinder 111. As the air cylinder 111 is operated, the piston rod 109 is urged upwardly from within the air cylinder, thereby retracting the fingers 88 and 89 from an area of the screwdriving and spin-staking operation. It is to be particularly noted that the actuation of the switch 114 to initiate the finger spreading and retracting operation occurs immediately prior to the entry of any portions of the fingers within the recess 35 of the terminal frame 31, thereby preventing the possibility of the fingers 88 and 89 being caught within the recess and subsequently captured between the head of the driven screw and the base of the recess. In this manner, damage to the screw 39 and the terminal frame 31 and the breaking of the screwdriver bit 78 and the fingers 88 and 89 are prevented. During this period, the spindle system continues to rotate and the screwdriver bit 78 partially drives the screw 39 into the threaded eyelet 40 until the stop device 69 precludes further downward axial and rotational movement of the spindle system which is declutched thereby. Thereafter, the screwdriver bit 78 holds the screw 39 stationary in the partially inserted position as the spin-staking bit 116, which is being rotated and raised as previously described, engages the threaded end of the screw to stake the screw as shown in FIG. 9. As previously noted, the spin-staking bit 116 is slideably positioned within the bit holder 117 and rests upon a compression spring to prevent the application of excess pressure upon the bit during the spin-staking operation.

As the fingers 88 and 89 are retracted, the lower actuator 113 of the U-shaped cam 112 engages the reset plunger of the maintained-contact switch 114 to open the switch, whereby the spreader solenoids 103 and 104 are deenergized to release the fingers 88 and 89 so that the fingers return to a substantially normal closed position under the biasing action of the spring 97 which is connected therebetween. In addition, the solenoid 154 is deactuated to close the air valve 156, thereby removing the air supply from the air cylinder 111. As the air supply is removed from the air cylinder 111, the biasing action of the spring 129 within the cylinder attempts to urge the piston 131, and hence the finger-supporting structure, downwardly. However, the throttling valve 157 is connected to the lower end of the air cylinder 111 to preclude rapid downward movement of the finger support system by bleeding off the air captured within the cylinder at a slow rate. In addition, the friction block 110, which is in engagement with the shaft 107, also precludes the rapid downward movement of the finger-supporting structure. Thereafter, the timer mechanism 152 opens the timer contacts associated with the staker solenoid 149 to close the air valve 151 whereupon the staker mechanism 144 ceases to rotate and is withdrawn toward the staker motor 43. In addition, a pair of normally open contacts associated with a timer mechanism 152 are closed to actuate a solenoid 158 which is connected in series therewith, whereby the double-acting air valve 134 is shifted to operate the air cylinder 136 in the reverse direction. In this manner, the lever 63 is pivoted upwardly, whereby the spindle system is urged upwardly so that the coupling member 77 engages the underside of the downwardly traveling finger suspension block 82 to urge the block upwardly against the underside of the spindle bushing 73. As the finger suspension block 82 is urged upwardly, the bevelled surfaces 98 of the upper ends of the fingers 88 and 89 engage the pin 99 to spread the fingers apart slightly, thereby permitting the single screw 39 to fall from the extended portion 41 of the chute 37 between the fingers so that it is captured thereby. In addition, the cam bar 139 is raised as the lever 63 is pivoted upwardly to open all the switches associated therewith. The system is now prepared for another cycle upon the actuation of the foot switch 132.

Thus, it is seen that the apparatus permits the screw-inserter fingers 88 and 89 to carry the screw 39 to an insertion position immediately prior to the driving of the screw into the threaded eyelet 40. Thereafter, the fingers are spread from engagement with the screw 39 and are retracted therefrom immediately prior to the entry of any portion of the fingers within the recess 35 of the terminal frame 31. In this manner, the fingers 88 and 89 are prevented from being captured between the subsequently driven screw 39 and the base of the recess 35. Also, the possibility of damage to the screw 39 and the terminal frame 31, and the breaking of the fingers 88 and 89 and the screwdriving bit 78 are prevented.

It is to be understood that the above-described apparatus is simply illustrative of the application of the principles of the invention. It will be observed that variations, changes and modifications may be made therein without departing from the spirit and scope of the invention.

What is claimed is:

1. A screw assembling and staking apparatus, which comprises:

a carrier, a pair of opposed holding fingers pivotally mounted on the carrier for receiving a screw therebetween and carrying the screw toward a workpiece mounted in a workstation upon movement of the carrier towards the workpiece, said workpiece having a threaded eyelet disposed within a recess thereof for subsequent insertion of the screw into the eyelet, a screwdriver bit rotatably and axially slideable between the opposed fingers for subsequent engagement with the screw to drive the screw into the threaded eyelet, means for spreading the fingers away from the screw, means for retracting the fingers upwardly away from the workpiece, means responsive to a predetermined downward movement of the fingers for simultaneously actuating the finger spreading and retracting means so that the fingers are spread to an open position and retracted as the screw is inserted into the threaded eyelet, and a spin-staking bit rotatably positioned beneath the workpiece for subsequent engagement with the positioned screw to spin-stake the threaded end of the screw.

2. A screw assembling and staking apparatus, which comprises:

a carrier, a pair of opposed holding fingers mounted on the carrier for receiving a screw therebetween and carrying the screw toward a workpiece mounted in a workstation upon movement of the carrier, said workpiece having a threaded eyelet disposed within a recess thereof for subsequent engagement with the screw to drive the screw within the threaded eyelet, means for spreading the fingers away from the screw, an air cyclinder connected to an air supply and having a piston rod attached to the upper ends of the pivotally mounted fingers for retracting the fingers upwardly subsequent to the spreading of the fingers, a solenoid-controlled valve connected between the air cylinder and the air supply for controlling the flow of air into the cylinder, means responsive to a predetermined downward travel of the fingers for simultaneously actuating the finger spreading means and the solenoid-controlled valve, whereby the fingers are pivoted away from the screw and the air cylinder is operated to retract the fingers, and a spin-staking bit rotatably positioned beneath the workpiece for subsequent engagement with the positioned screw to spin-stake the threaded end of the screw.

3. A screw assembling and staking apparatus, which comprises:

a carrier, a pair of opposed holding fingers pivotally mounted on the carrier for receiving a screw therebetween and carrying the screw toward a workpiece mounted in a workstation upon movement of the carrier, said workpiece having a threaded eyelet disposed within a recess thereof for subsequent insertion of the screw into the eyelet, a screwdriver bit rotatably and axially slideable between the opposed fingers for subsequent engagement with the screw to drive the screw within the threaded eyelet, a pair of opposed solenoids positioned adjacent intermediate portions of the outer edges of the pivotal fingers for pivoting the fingers away from the screw, means for retracting the fingers upwardly away from the workpiece, means responsive to a predetermined downward travel of the fingers for simultaneously actuating the solenoids and the retracting means, whereby the fingers are pivoted away from the screw and retracted upwardly therefrom, and a spin-staking bit rotatably positioned beneath the workpiece for subsequent engagement with the positioned screw to spin-stake the threaded end of the screw.

4. A screw assembling and staking apparatus, which comprises:

a carrier, a pair of opposed holding fingers pivotally mounted on the carrier for receiving a screw therebetween and carrying the screw upon movement of the carrier toward a terminal frame having a threaded eyelet disposed within a recess of the terminal frame for subsequent insertion of the screw into the eyelet, a screwdriver bit rotatably and axially slideable between the opposed fingers for subsequent engagement with the screw to threadedly drive the screw within the threaded eyelet, a pair of opposed solenoids positioned adjacent to and along the outer edges of the pivotally mounted fingers for pivoting the fingers away from the screw, an air cylinder connected to an air supply and having an piston rod attached to the upper ends of the pivotally mounted fingers for retracting the fingers away from the screw, a solenoid-controlled valve connected between the air cylinder and the air supply for controlling the flow of air into the cylinder, an electrical control circuit actuated by a predetermined downward movement of the fingers to simultaneously actuate the finger pivoting solenoids and the finger retracting solenoid-controlled valve, whereby the fingers are pivoted away from the screw and retracted away from the terminal frame by upward movement of the piston within the air cylinder, and a spin-staking bit rotatably positioned beneath the terminal frame for subsequent engagement with the positioned screw to spin-stake the threaded end of the screw.

References Cited by the Examiner

UNITED STATES PATENTS

| | | | |
|---|---|---|---|
| 1,885,986 | 11/32 | Butler | 78—53 |
| 1,909,366 | 5/33 | Koja | 78—53 |
| 2,490,954 | 12/49 | Flick | 78—61 |
| 2,728,133 | 12/53 | Andersen | 29—34 |
| 2,729,884 | 1/56 | Mautone | 29—522 |
| 2,854,867 | 10/58 | Smith | 76—107 |
| 2,968,976 | 1/61 | Cale | 78—61 |
| 3,057,042 | 10/62 | Lawson | 29—34 |
| 3,080,776 | 3/63 | Muenchinger | 76—107 |

RICHARD H. EANES, Jr., *Primary Examiner.*